US010671911B2

(12) United States Patent
Ritter et al.

(10) Patent No.: US 10,671,911 B2
(45) Date of Patent: Jun. 2, 2020

(54) CURRENT MIRROR SCHEME FOR AN INTEGRATING NEURON CIRCUIT

(71) Applicant: INTERNATIONAL BUSINESS MACHINES CORPORATION, Armonk, NY (US)

(72) Inventors: Mark B. Ritter, Sherman, CT (US); Takeo Yasuda, Nara-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/047,936

(22) Filed: Feb. 19, 2016

(65) Prior Publication Data
US 2017/0243108 A1 Aug. 24, 2017

(51) Int. Cl.
G06N 3/063 (2006.01)
G05F 3/26 (2006.01)
G06N 3/04 (2006.01)
G06N 3/08 (2006.01)

(52) U.S. Cl.
CPC .............. G06N 3/063 (2013.01); G05F 3/262 (2013.01); G06N 3/049 (2013.01); G06N 3/08 (2013.01)

(58) Field of Classification Search
CPC ....... G06N 3/063; G06N 3/0635; G05F 3/262
USPC .............. 327/53, 77, 82; 330/255, 257, 288
See application file for complete search history.

(56) References Cited

U.S. PATENT DOCUMENTS

| 5,089,769 | A | 2/1992 | Petty et al. |
| 5,583,425 | A | 12/1996 | Rapp et al. |
| 5,914,868 | A | 6/1999 | Han et al. |
| 6,188,270 | B1 | 2/2001 | Boerstler |
| 6,433,624 | B1 | 8/2002 | Grossnickle et al. |
| 6,744,299 | B2 | 6/2004 | Geysen et al. |
| 6,829,598 | B2 | 12/2004 | Milev et al. |
| 2004/0139040 | A1* | 7/2004 | Nervegna ............... G06N 3/063 706/15 |
| 2014/0292411 | A1* | 10/2014 | Cavallaro ............... H03F 1/308 330/257 |

OTHER PUBLICATIONS

Nagata, "Limitations, innovations, and challenges of circuits and devices into a half micrometer and beyond," IEICE Transactions on Electronics, vol. 75, No. 4, 1992, pp. 363-370.

(Continued)

Primary Examiner — Lincoln D Donovan
Assistant Examiner — Colleen J O Toole
(74) Attorney, Agent, or Firm — Cantor Colburn LLP; Vazken Alexanian

(57) ABSTRACT

Embodiments are directed to a driver circuit including a first amplifier having a voltage follower configured to control a first node to maintain a voltage of the first node at a constant value. By maintaining the first node voltage, the first amplifier having the voltage follower is further configured to have a first amplifier output current into the first node at a value without the effect of the voltage fluctuation. The driver circuit further includes a second amplifier configured to control a second node, wherein the second amplifier is in a current mirror configuration with respect to the first amplifier such that a second amplifier current output is a highly precise mirror of the first amplifier current output.

25 Claims, 14 Drawing Sheets

(56) References Cited

OTHER PUBLICATIONS

Rajendran et al., "Specifications of nanoscale devices and circuits for neuromorphic computational systems," IEEE Transactions on Electron Devices, vol. 60, No. 1, 2013, pp. 246-253.
Zhang et al., "32-Channel Full Customized CMOS Biosensor Chip for Extracellular neural Signal Recording.". 2nd International IEEE EMBS Conference on Neural Engineering, 2005, pp. 660-663.

* cited by examiner

Equation(1) $\quad I_{dld\_m} = -w_{m,0} \cdot I_{ald_0} - w_{m,1} \cdot I_{ald_1} - \ldots - w_{m,n-1} \cdot I_{ald_{n-1}}$ $$= -\sum_{i=0}^{n-1} w_{m,i} \cdot I_{ald_i}$$

Equation(2) $\quad I_{icm\_amp\_m} = k \cdot I_{dld_m}$ $$= k \cdot (-w_{m,0} \cdot I_{ald_0} - w_{m,1} \cdot I_{ald_1} - \ldots - w_{m,n-1} \cdot I_{ald_{n-1}})$$

$$= -k \cdot \sum_{i=0}^{n-1} w_{m,i} \cdot I_{ald_i}$$

(k is the size ratio of devices used in ald and nif_amp)

FIG. 6B

CURRENT MIRROR SCHEME FOR AN INTEGRATING NEURON CIRCUIT

BACKGROUND

The present disclosure relates in general to artificial neural networks (ANNs) formed from analog signal processing circuitry that models the information processing functionality of a human brain. More specifically, the present disclosure relates to ANNs having current mirror driver circuitry that suppresses voltage change at a charging node of an integrating neuron circuit, thereby maintaining constant current between upstream weighted synapse circuitry and downstream integrating neuron circuitry.

The neuron is a central element of biological neural systems. It has been estimated that the average human brain contains about 100 billion neurons, and, on average, each neuron is connected through fibers to about 1000 other neurons. These neurons and their interconnections form vast and complex biological neural networks that are the mainstay of the brain's processing capabilities. Neurons are remarkable among the cells of the body in their ability to propagate signals such as spike trains or action potentials rapidly over large distances. So-called sensory neurons change their activities by firing sequences of spike trains in various temporal patterns in response to the presence of external stimuli, such as light, sound, taste, smell and touch. Information about a stimulus is encoded in this pattern of action potentials and transmitted into and around the brain.

In biological neural systems, the point of contact between an axon of one neuron and a dendrite on another neuron is called a synapse. With respect to the synapse, the two neurons are respectively called pre-synaptic neuron and post-synaptic neuron. Neurons, when activated by sufficient inputs received via synapses, emit spikes that are delivered to those synapses. Neurons can be either "excitatory" or "inhibitory." Synaptic conductance is a measure of the influence a synapse will have on its post-synaptic target neuron when the synapse is activated by a pre-synaptic neuron's spike. A person's mental possession of individual experiences is stored in the conductance of synapses which determines the amount of the spike transmission across the trillions of synapses throughout the brain.

The human brain has many desirable characteristics not present in contemporary computer systems, including but not limited to massive parallelism, distributed representation and computation, learning ability, generalization ability, adaptability, inherent contextual information processing, fault tolerance and low energy consumption. Contemporary digital computers outperform humans in the domain of numeric computation and related symbol manipulation. However, humans can effortlessly solve complex perceptual problems (e.g., recognizing an acquaintance in a crowd from a mere glimpse of the person's face) at a speed and to an extent that dwarfs the fastest computer. A reason for such a remarkable difference in the performance of biological neural systems and computers is that the biological neural system architecture is completely different from a typical computer system architecture. This difference significantly affects the types of functions each computational model can best perform.

ANNs are a family of statistical learning models inspired by the biological neural networks of animals, and in particular the brain. ANNs are often embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with synaptic weights that correspond to the strength or weakness of a given connection. The weights can be adjusted and tuned based on experience, making ANNs adaptive to inputs and capable of learning. For example, an ANN for handwriting recognition is defined by a set of input neurons that may be activated by the pixels of an input image. After being weighted and transformed by a function determined by the network's designer, the activations of these input neurons are then passed to other downstream neurons, which are often referred to as "hidden" neurons. This process is repeated until an output neuron is activated. The activated output neuron determines which character was read.

Crossbar arrays, also known as crosspoint arrays or crosswire arrays, are high density, low cost circuit architectures used to form a variety of electronic circuits and devices, including ANN architectures, neuromorphic microchips and ultra-high density nonvolatile memory. A basic crossbar array configuration includes a set of conductive row wires and a set of conductive column wires formed to intersect the set of conductive row wires. The intersections between the two sets of wires are separated by so-called crosspoint devices, which in effect, function as the synapse components and provide the weighted connections between neuron components.

FIG. 1 depicts a neural network system 100, which is an example configuration of an ANN. System 100 includes a synapse array 102 (e.g., a crossbar array) formed from a plurality of weighted synapse components 104 and neuron components 110, 112, 114, 116, 118, configured and arranged as shown. Neuron components 110, 112, 114, 116, 118, which are shown as Neuron$_{n-1}$, Neuron$_{n-2}$, Neuron$_m$, Neuron$_1$ and Neuron$_0$ in FIG. 1, communicate signals (e.g., spike trains) to the plurality of weighted synapse components 104 over axon lines 140 (i.e., conductive column wires) and receives weighted and summed signals over dendrite lines 120 (i.e., conductive row wires). Dendrite lines 120 include dendrite lines 122, 124, 126, 128, 130, which are shown as dendrite$_{n-1}$, dendrite$_{n-2}$, dendrite$_m$, dendrite$_1$ and dendrite$_0$ in FIG. 1. Axon lines 140 include axon lines 142, 144, 146, 148, 150, which are shown as axon$_{n-1}$, axon$_{n-2}$, axon$_m$, axon$_1$ and axon$_0$ in FIG. 1.

System 100 is a low power system that is implemented using analog signal processing circuitry to model the neuron and synapse components (e.g., 110, 112, 114, 116, 118, 104) of system 100. The analog signal processing is used to model the generation and communication of signals through synaptic connections between neuron components. Output current generated and transmitted through system 100 is used for the control of downstream circuit components. For example, in system 100, synapse current flowing into or flowing out from axon lines 140 provides the stimulus for downstream neuron components. Because system 100 is low power, small unintended variations in certain system parameters can cause errors. For example, system parameters such as the control current on dendrite lines 120 flowing into neuron components 110, 112, 114, 116, 118 are in a critical path and must be independent of other system parameters such as the voltages at the nodes on dendrite lines 120 leading into neuron components 110, 112, 114, 116, 118. Undesired changes in the current on dendrite lines 120 due to the dendrite node voltage may be the result of channel length modulation effects of the MOSFETs which are used as circuit devices to implement neuron and synapse components 110, 112, 114, 116, 118, 104. The channel length modulation effect in MOSFET I-V characteristic is shown in FIG. 5.

It would be beneficial to provide ANN circuitry, wherein key system parameters (e.g., dendrite current into neuron components) are not affected by the undesired effects that can result from undesired variations in such key system parameters.

SUMMARY

Embodiments are directed to a driver circuit including a first amplifier having a voltage follower configured to control a first node to maintain a voltage of the first node at a constant value. The first amplifier having the voltage follower is further configured to have a first amplifier output current into the first node at a value without being affected by the voltage fluctuation. The driver circuit further includes a second amplifier configured to control a second node, wherein the second amplifier is in a current mirror configuration with respect to the first amplifier because the output current of a second amplifier is a mirror of (or the same as) the output current of the first amplifier final stage.

Embodiments are further directed to a driver circuit including a first amplifier having a first amplifier first stage, a first amplifier final stage which drives a first amplifier final stage output current, wherein the first amplifier final stage output is connected to a first node, and wherein the first amplifier further comprises a voltage follower configured to control the first node to maintain a voltage of the first node at a constant value, and to control the first amplifier final stage output current so that the voltage of the first node stays at a constant value. The driver circuit further includes a second amplifier configured to control a second node, wherein the second amplifier is in a current mirror configuration with respect to the first amplifier because the output current of a second amplifier is a mirror of (or the same as) the output current of the first amplifier final stage.

Embodiments are further directed to a driver circuit including a first amplifier having a first amplifier first stage, a first amplifier first stage positive output, a first amplifier first stage negative output and a first amplifier final stage which drives a first amplifier final stage output current, wherein the first amplifier final stage output is connected to a first node, and wherein the first amplifier further comprises a voltage follower configured to control the first node to maintain a voltage of the first node at a constant value, and to control the first amplifier final stage output current sot that the voltage of the first node stays at a constant value. The driver circuit further includes a second amplifier configured to control a second node, wherein the second amplifier includes a second amplifier positive input and a second amplifier negative input, wherein the first amplifier first stage positive output is connected to the first amplifier final stage and the second amplifier positive input, and wherein the first amplifier first stage negative output is connected to the first amplifier final stage and the second amplifier negative input. The first amplifier final stage includes first amplifier final stage internal components, wherein the second amplifier includes second amplifier internal components, wherein the first amplifier final stage internal components have substantially the same structure and size as the second amplifier internal components, and wherein the second amplifier is in a current mirror configuration with respect to the first amplifier because the output current of a second amplifier is a mirror of (or the same as) the output current of the first amplifier final stage.

Embodiments are further directed to a method of operating a driver circuit, the method includes using a first amplifier having a voltage follower to control a first node to maintain a voltage of the first node at a constant value, and to control a first amplifier output current so that the voltage of the first node stays at a constant value. The method further includes using a second amplifier to control a second node, and operating the second amplifier in a current mirror configuration with respect to the first amplifier because the output current of a second amplifier is a mirror of (or the same as) the output current of the first amplifier final stage.

Embodiments are further directed to a method of operating a driver circuit, the method includes using a first amplifier having a voltage follower to control a first node to maintain a voltage of the first node at a constant value, wherein the first amplifier includes a first amplifier first stage, a first amplifier final stage which drives a first amplifier final stage output current. The method further includes using the first amplifier having the voltage follower to further maintain the first amplifier final stage output current so that the voltage of the first node stays at a constant value, wherein the first amplifier final stage output is connected to the first node. The method further includes using a second amplifier to control a second node, and operating the second amplifier in a current mirror configuration with respect to the first amplifier because the output current of a second amplifier is a mirror of (or the same as) the output current of the first amplifier final stage.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

FIG. 6B depicts equations further illustrating operation of the current integration with voltage hold circuit shown in FIG. 6A;

DETAILED DESCRIPTION

It is understood in advance that although one or more embodiments are disclosed in the context of biological neural networks with a specific emphasis on modeling brain structures and functions, implementation of the teachings recited herein are not limited to modeling a particular environment. Rather, embodiments of the present disclosure are capable of modeling any type of environment, including for example, weather patterns, arbitrary data collected from the internet, and the like, as long as the various inputs to the environment can be turned into a spike vector.

Although the present disclosure is directed to an electronic system, for ease of reference and explanation various aspects of the disclosed electronic system are described using neurological terminology such as neurons, plasticity and synapses, for example. It will be understood that for any discussion or illustration herein of an electronic system, the use of neurological terminology or neurological shorthand notations are for ease of reference and are meant to cover the neuromorphic, ANN equivalent(s) of the described neurological function or neurological component.

Figure 1:
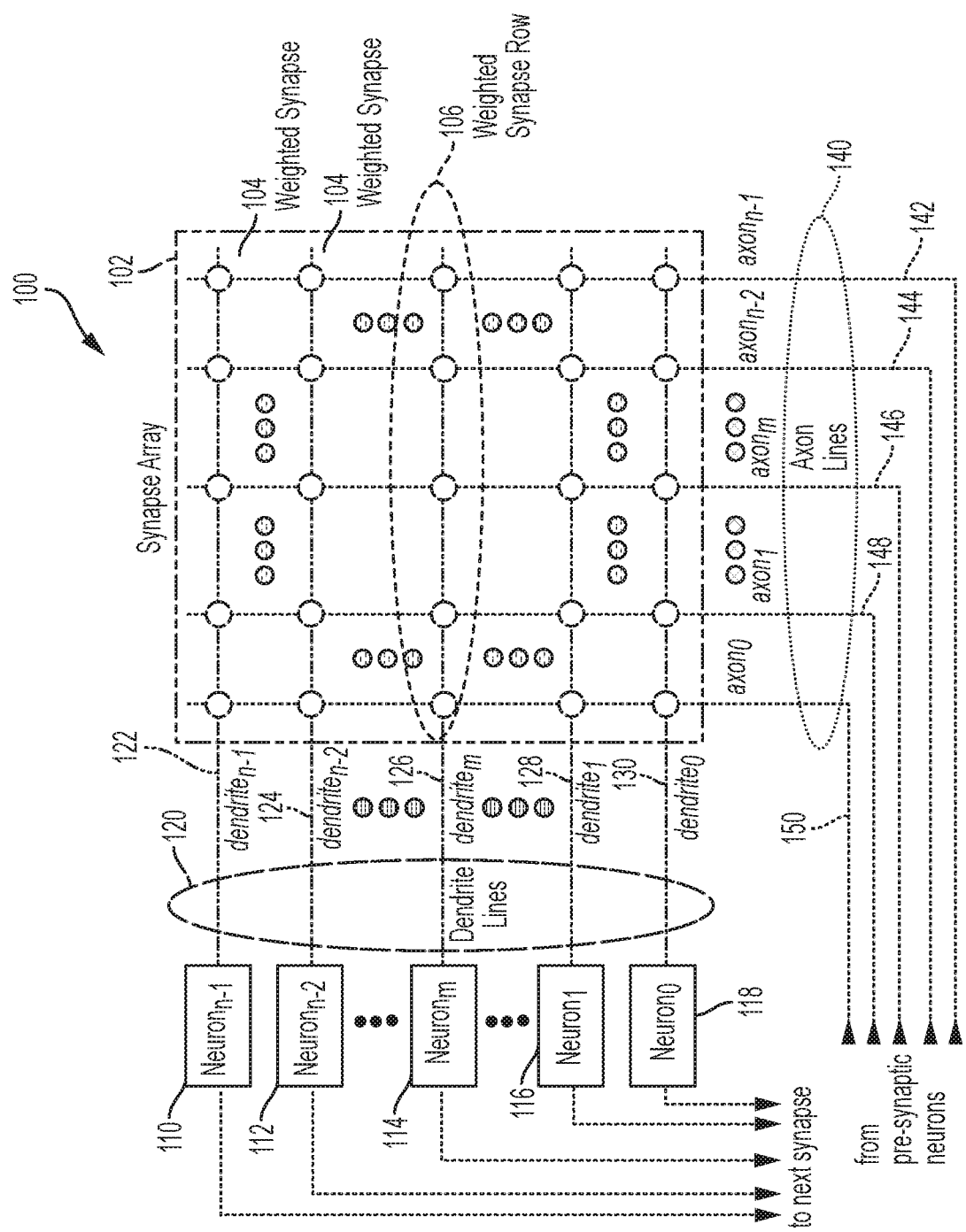
FIG. 1 depicts a neural network system capable of utilizing one or more embodiments of the present disclosure.
Figure 2:
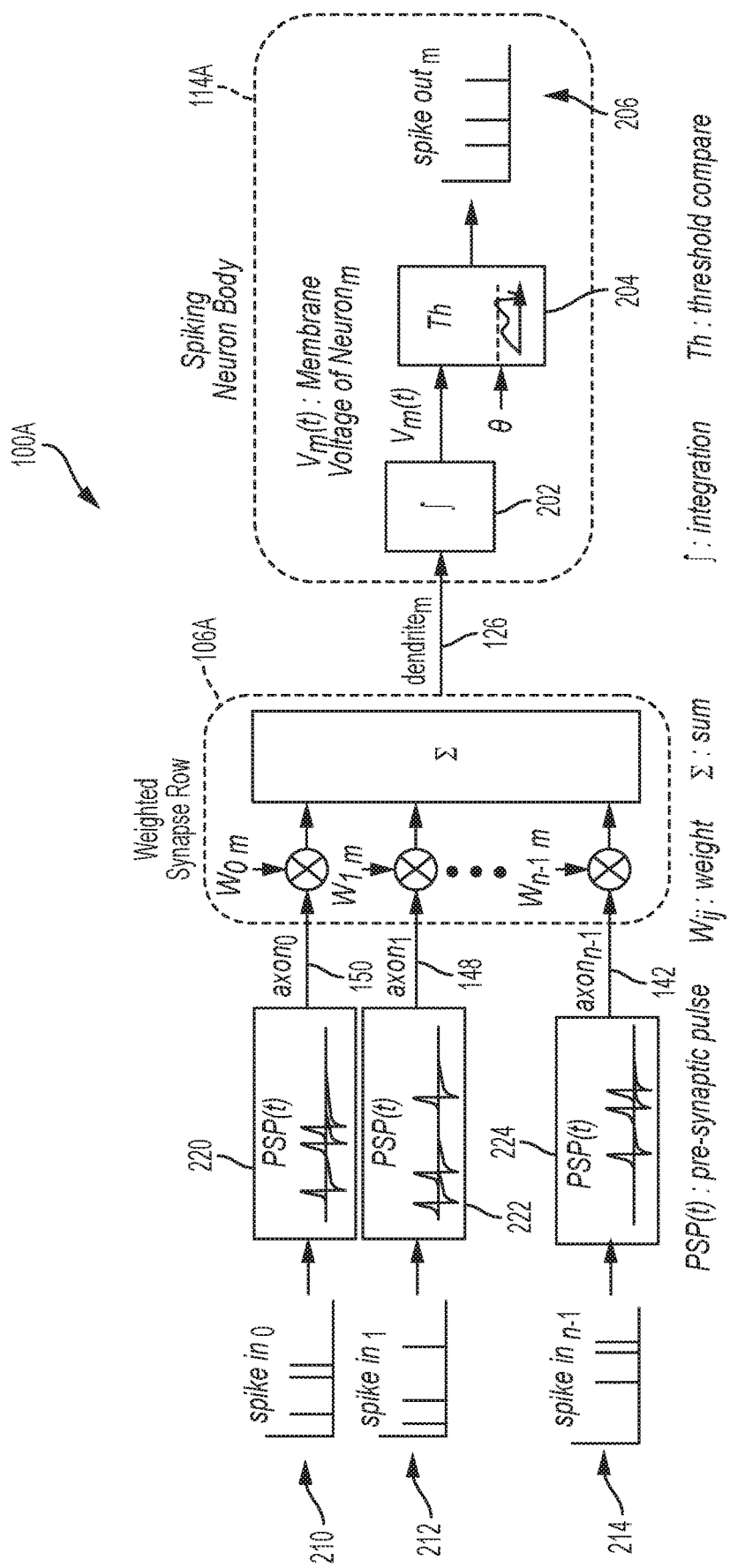
FIG. 2 depicts a mathematical model of the spiking neuron and the synapse for a portion of the neural network system shown in FIG. 1.

Turning now to an overview of the problem(s) addressed by the present disclosure, FIG. 2 depicts a portion 100A of neural network system 100 (i.e., an ANN) shown in FIG. 1. As previously noted herein, a typical ANN models the human brain, which includes about one hundred billion interconnected cells called neurons. Each biological neuron sends and receives electrical impulses through synaptic pathways that connect it to upstream inputs, downstream output s and downstream "other" neurons. The nature of these electrical impulses and how they are processed in a biological neuron are primarily responsible for overall brain functionality. The synaptic pathway connections between biological neurons can be strong or weak. When a given neuron receives input impulses, the neuron processes the input according to the neuron's function and sends the result of the function to the downstream outputs and/or the downstream "other" neurons.

System portion 100A depicts a weighted synapse row model 106A and a spiking neuron model 114A. Weighted synapse row model 106A corresponds to a weighted synapse row 106 shown in FIG. 1. Spiking neuron model 114A corresponds to neuron component 114 (i.e., Neuron$_m$) shown in FIG. 1. Spike trains 210, 212, . . . , 214 are generated by upstream neurons or pre-synaptic neurons (not shown) and are provided to pre-synaptic pulse functions, PSP(t), 220, 222, . . . , 224, which provide currents on axon lines 150, 148, . . . , 142 (e.g., axon$_0$, axon$_1$, . . . , axon$_{n-1}$) to weighted synapse row 106A. The weighted synapse row model 106A includes weighting functions $w_{ij}$. Because j equals m for weighted synapse row 106A, weights are shown as $w_{0\ m}$, $w_{1\ m}$, . . . $w_{n-1\ m}$, and a summation function 1, wherein each axon current is weighted and summed then provided as dendrite current on dendrite line (e.g., dendrite$_m$) 126 to spiking neuron model 114A.

Weighted synapse row model 106A multiplies each axon current (e.g., axon$_0$, axon$_1$, . . . , axon$_{n-1}$) by a weight $w_{i\ m}$ (i=0, 1, . . . , n-1) that represents the strength of the respective synaptic connection pathway, takes a sum of the weighted axon currents, and passes the sum current on dendrite line (i.e., dendrite$_m$) 126 to spiking neuron model 114A. For weak synapse connection, axon current is multiplied by a small number ($w_{i\ m}$), so the impact of a weak synapse connection on spiking neuron model 114A is small. Similarly for strong synapse connection, axon current is multiplied by a large number ($w_{i\ m}$), so the impact of a strong synapse connection on spiking neuron model 114A is large.

Spiking neuron model 114A applies an integration $\int$ operation 202 for the input current on dendrite$_m$ 126 to generate a membrane voltage (potential) of neuron m $V_m(t)$, which is then compared with threshold level θ at a threshold compare block (Th) 204 to generate an output spike train (spike out$_m$) 206. More specifically, the total summation Σ of weighted axon currents is integrated to determine the neuron membrane voltage (potential) $V_m(t)$, which is compared with a threshold voltage value θ to cause firing of spiking neuron model 114A to generate output spike train (spike out$_m$) 206. This function for spiking neuron and synapse are true for all weight synapse row connected to neuron j (j=0, 1, . . . , n-1) and neuron body model for neurons j (j=0, 1, . . . , n-1).

Figure 3:
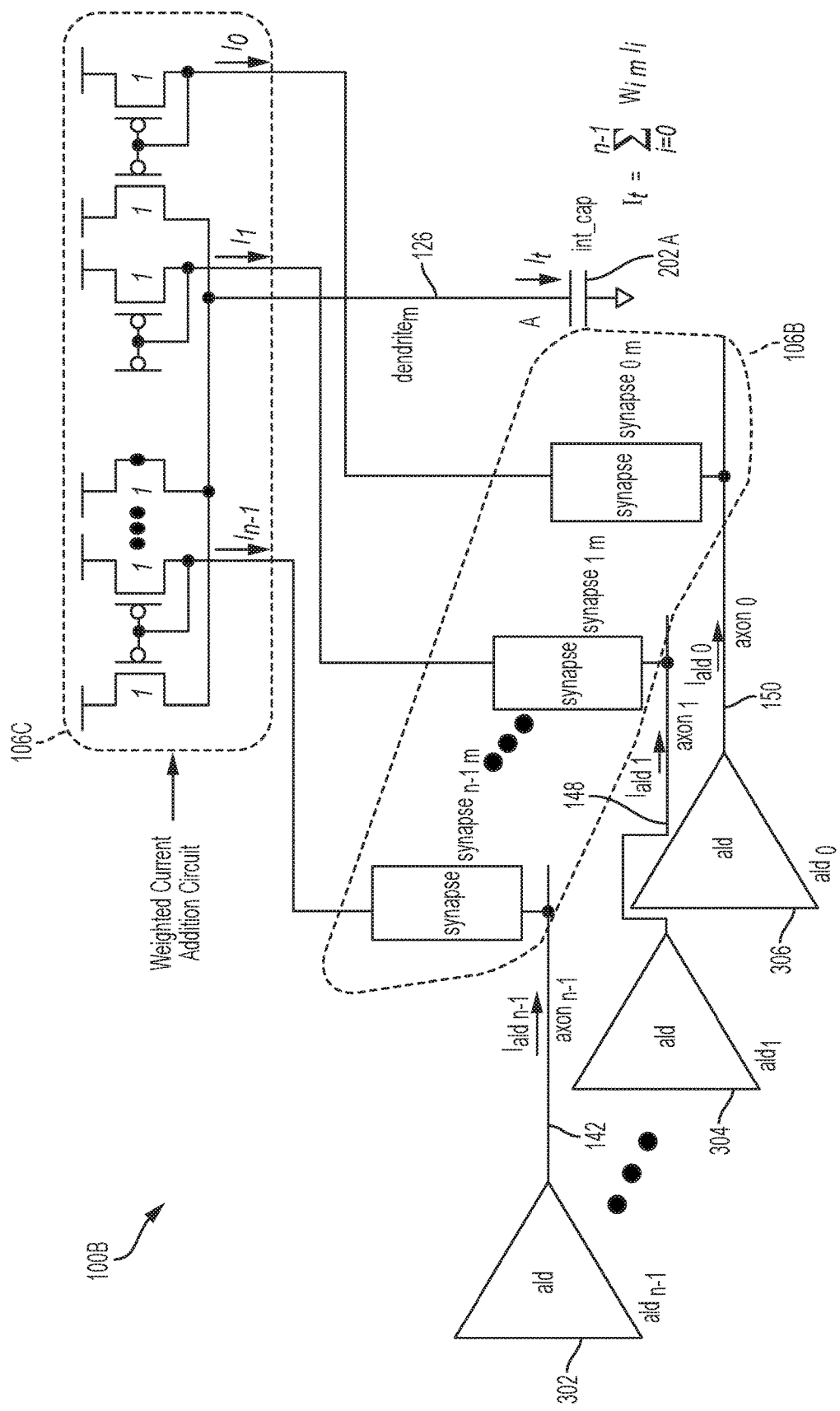
FIG. 3 depicts a capacitive charge current integration circuit with conventional circuit schemes.
Figure 4:
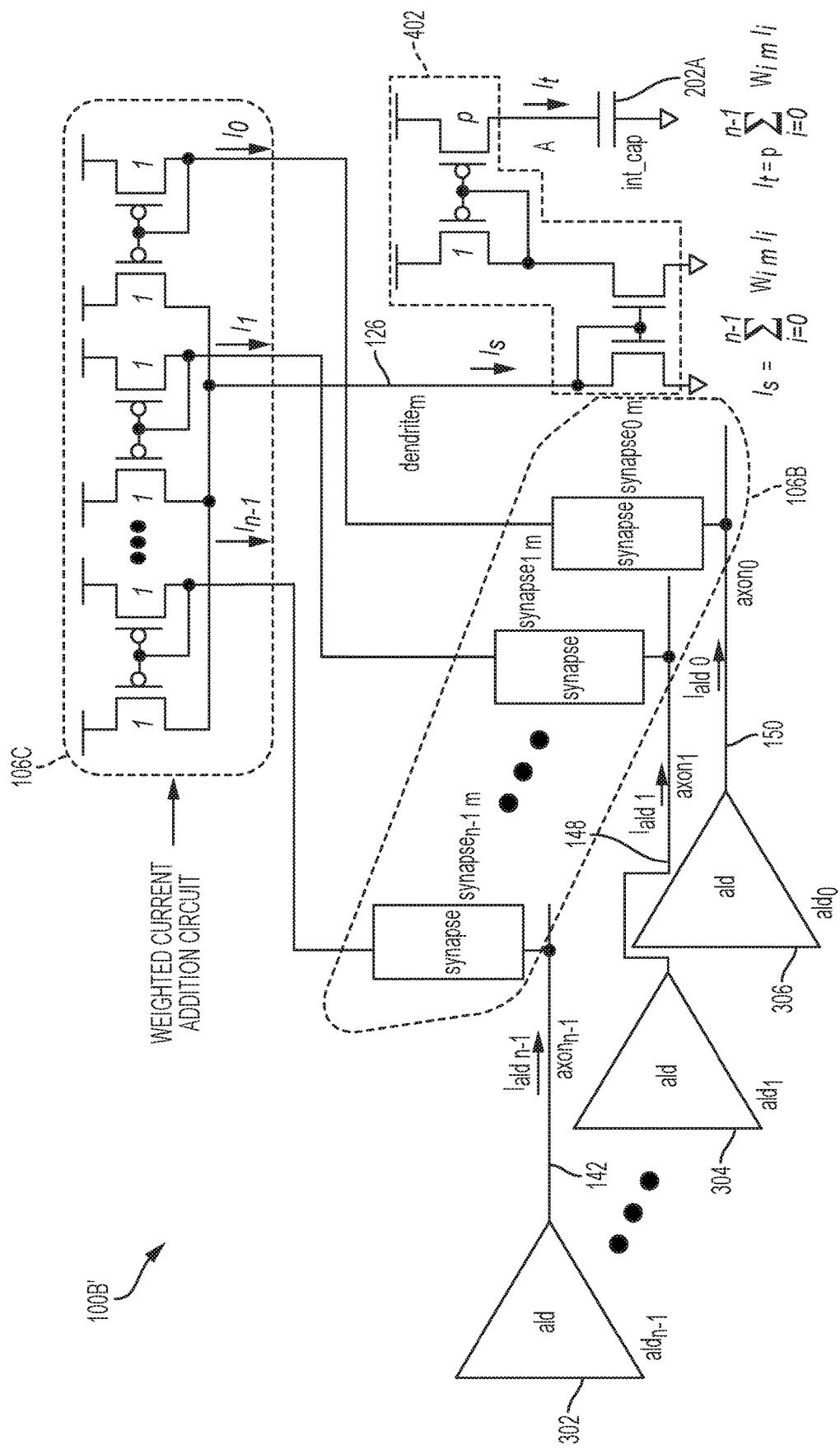
FIG. 4 depicts another capacitive charge current integration circuit with conventional circuit schemes.
Figure 5:
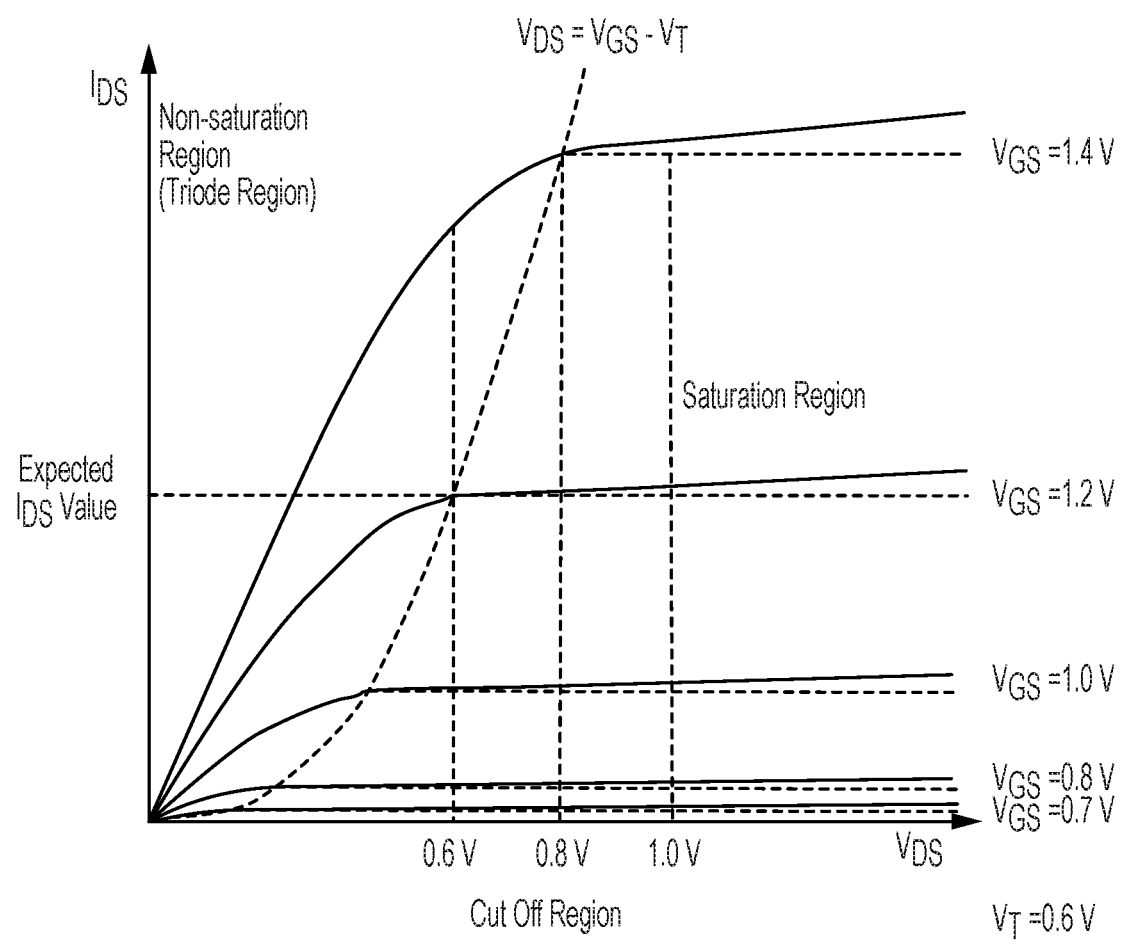
FIG. 5 depicts a diagram of a MOSFET I-V characteristic curve with channel length modulation, which illustrates how device drain-source current ($I_{DS}$) is affected by drain-source voltage ($V_{DS}$)

FIG. 3 depicts an exemplary implementation 100B of system portion 100A shown in FIG. 2 with a conventional circuit scheme. In this implementation 100B, weighted synapse row model 106A (shown in FIG. 2) is implemented as a synapse row 106B and a weighted current addition circuit 106C. Also in the implementation 100B, integration $\int$ operation 202 of spiking neuron model 114A (shown in FIG. 2) is implemented as an integrating capacitor 202A (int_cap). Further in the implementation 100B, axon line drivers (alds) 306, 304, . . . , 302 drive axon lines 150, 148, . . . , 142, respectively, into synapse row 106B. Similarly, FIG. 4 depicts another exemplary implementation 100B' of system portion 100A shown in FIG. 2 with a conventional circuit scheme. In the implementation 100B', weighted synapse row model 106A (shown in FIG. 2) is implemented as synapse row 106B and weighted current addition circuit 106C. Also in the implementation 100B', integration $\int$ operation 202 of spiking neuron model 114A (shown in FIG. 2) is implemented as integrating capacitor 202A (int_cap). Further in the implementation 100B', axon line drivers (ald) 306, 304, . . . , 302 drive axon lines 150, 148, . . . , 142, respectively, into synapse row 106B. A multiplying current mirror circuit 402 provides a current multiplication operation prior to integrating capacitor 202A.

In either FIG. 3 or FIG. 4, weighted current addition circuit 106C is a configuration of MOSFET current source devices that generate $I_t$ or $I_s$ which are the total current of the weighted current values $I_0$, $I_1$, . . . , $I_{n-1}$. In FIG. 3, integration $\int$ operation 202 (shown in FIG. 2) is performed by charging integrating capacitor 202A directly with the weighted total current $I_t$. In FIG. 4, integration $\int$ operation 202 (shown in FIG. 2) is performed by charging integrating capacitor 202A with the p-times weighted total current $pI_s$. This p-times multiplication is achieved by additional current mirror stages 402.

In either FIG. 3 or FIG. 4, the amount of current, $I_t$, depends on the voltage potential of the node A even if the drive device of $I_t$ has high-output-impedance. This dependency is undesired in ANNs such as a system 100 (shown in FIG. 1) because the amount of the charging current ($I_t$) to the node A should be independent of the voltage potential of the node. Otherwise the voltage of the node A affects the amount of the current $I_t$. In the illustrated implementations of FIG. 3 and FIG. 4, the voltage of the node A corresponds to the membrane voltage (potential) of neuron$_m$ ($V_m(t)$) in FIG. 2. That is, the $I_t$ will be decreased (or increased) when the $V_m(t)$ is raised (or lowered) although the current integration without the effect of voltage is desired operation. The present disclosure provides circuit configurations to make the amount of the charging current ($I_t$) to the node A independent of the voltage potential of node A when there are any inputs from axon$_i$ (i=0, 1, . . . n−1). More specifically, one or more embodiments of the present disclosure provide current mirror driver circuitry that suppresses voltage change at charging node A by separating node A into reference current node and integration node for capacitance charge. Thereby, the voltage of reference current node can be kept constant to avoid the fluctuation of the current from weighted current addition circuit 106C even if the voltage potential of integration node increases or decreases.

Figure 6A:
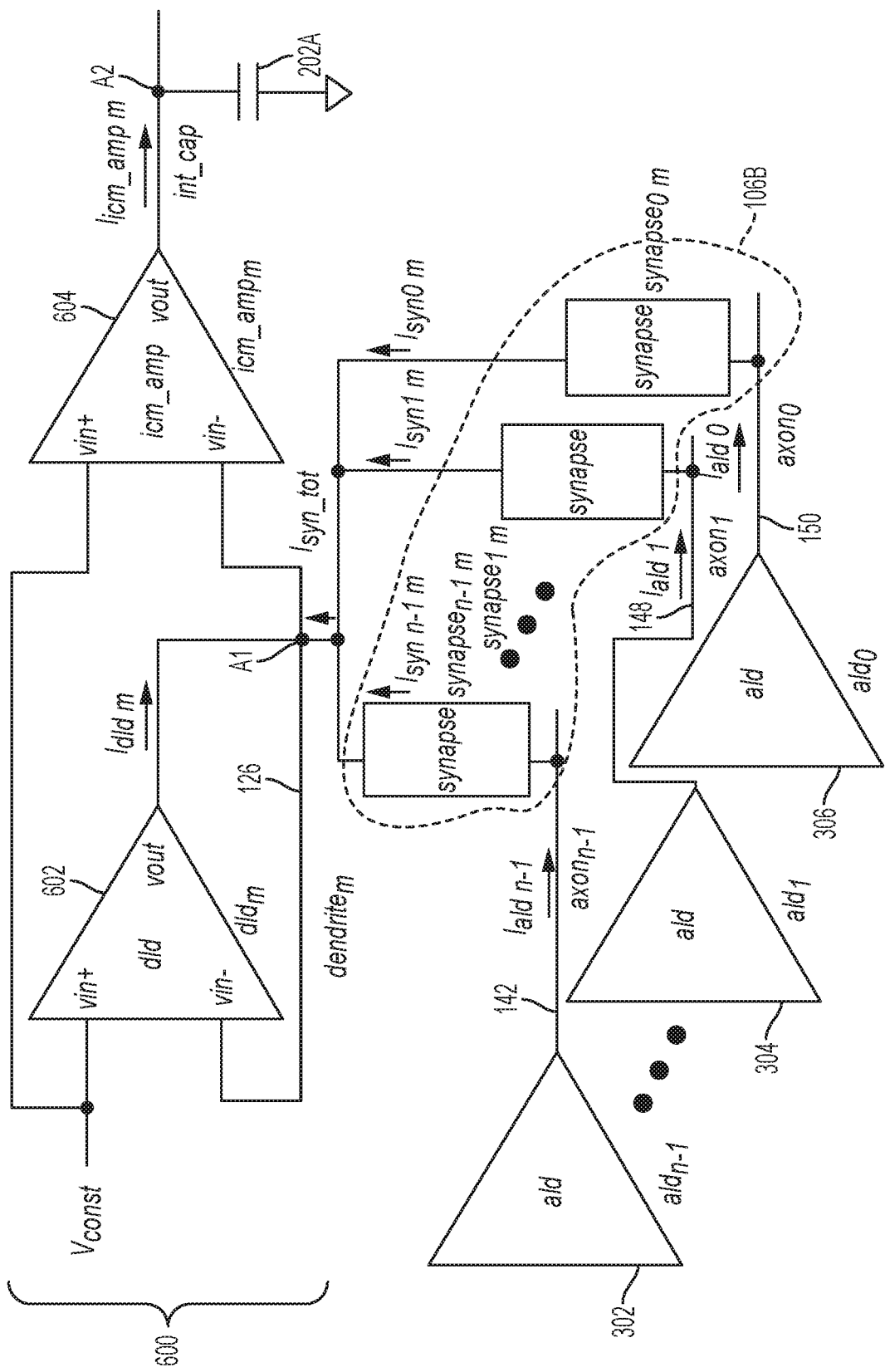
FIG. 6A depicts a simplified block diagram of a current integration circuit with voltage hold circuit according to one or more embodiments of the present disclosure.

Turning now to a more detailed description of the present disclosure, FIG. 6A depicts a modification of system portion 100B in FIG. 3 which is implemented by a conventional scheme, wherein a current integration with voltage hold circuit 600 according to one or more embodiments is provided. It is noted that, although circuit 600 of the present disclosure is described as the replacement of the block 106C in FIG. 3. The circuit 600 can be a replacement of the blocks 106C and 402 in FIG. 4. The circuit 600 includes a dendrite line driver (dld) 602 and an integration current mirror amplifier (icm_amp) 604, configured and arranged as shown. Node A shown in FIG. 3 is in fact both the output node of weighted current addition circuit 106C and the input node of integrating capacitor 202A. According to the present disclosure, node A of FIG. 3 is separated into node A1 and node A2 in FIG. 6A. In circuit 600, dld 602 is supplied with a constant voltage $V_{const}$ into its vin+ input, and the node A1 is connected to its vin− input and vout output. In other words, the dld 602 is connected to work as a voltage follower, wherein its vout level is controlled to be equal to its vin+ level, $V_{const}$. In operation, the same amount of current of the total current from (or to) synapse row 106B is pulled (or pushed) by the dld 602 in order to keep the node A1 to the voltage level $V_{const}$. Thus the current $I_{dld\ m}$ is the copied current of the one from (or to) synapse 106B.

Continuing with circuit 600 of FIG. 6A, each axon node axon$_i$ (i=0, 1, . . . , n−1) is driven by aid$_i$ (i=0, 1, . . . , n−1) 306, 304, . . . , 302, respectively, while dendrite$_m$ node (A1) is driven by the m-th dendrite line driver dld$_m$ 602. The input nodes to dld 602 are also connected to the m-th integration current mirror fire amplifier icm_amp$_m$ 604, which has the same structure as dld 602. The dendrite$_m$ node A1 is being kept at constant voltage $V_{const}$ by the voltage follower configuration of dld 602 even though ald$_i$ (e.g., 306, 304, . . . , 302) pushes in (or pulls out) current to (or from) node A1 126 through synapse row 106B. Thus, the output current of the dld 602, $I_{dld\ m}$, is controlled so that its absolute amount is equal to that of the total current from (or to) synapse row 106B ($I_{syn\_tot}$) and the direction is opposite (if $I_{dld\ m}$ is push-out direction, $I_{syn\_tot}$ is pull-in direction and vice versa) in order to keep the voltage potential of dendrite$_m$ node A1 constant. For example in the FIG. 6A the arrows for $I_{dld\ m}$ and $I_{syn\_tot}$ are both directed to push-out the current. In this case, one of them should be a positive value (push-out current in real circuit) and others should be negative with the same absolute number (pull-in current in real circuit). Thus there is no charge increment and decrement at node A1 126 which keeps its voltage potential constant.

Continuing with circuit 600 of FIG. 6A, the current from synapse$_{i\ m}$ (i=0, 1, . . . , n−1) to (or from) node A1 126$t$ is determined by axon current $I_{aid\ i}$ (i=0, 1, . . . , n−1) and the weight of synapse$_{i\ m}$ (i=0, 1, . . . , n−1). If the weight is heavy (or light) the resistance is small (or large) and the $I_{syn\ i\ m}$ which is the large (or small) part of the $I_{aid\ i}$ (i=0, 1, . . . , n−1) flows through synapse$_{i\ m}$ (i=0, 1, . . . , n−1). The direction is determined by that of $I_{ald\ m}$. That is, if $I_{ald\ i}$ (i=0, 1, . . . , n−1) is in the push-out (or pull-in) direction from (or to) ald$_i$, $I_{syn\ i\ m}$ (i=0, 1, . . . , n−1) is in the up (or down) direction. The value of the current from synapse$_{i\ j}$ (e.g., synapse 104 shown in FIG. 1) is determined by the resistance value of synapse$_{i\ j}$, which corresponds to the weight multiply function provided by just dotted connection in FIG. 6A. Thus the current $I_{dld\ m}$ output from dld 602 is determined according to Equation (1) shown in FIG. 6B. If the input signals are same and the circuit structures are common with the size ratio of k for the dld 602 and the icm_amp 604. The output current $I_{icm\_amp\ m}$ of icm_amp 604 will ideally be expressed with Equation (2) shown in FIG. 6B. In order to implement common structure for the dld 602 and the icm_amp 604, the dld 602 is copied to icm_amp 604 with the device ratio of k. For the same input signals the input signals to the final stage of the dld 602 is used to also as the input signals to the icm_amp 604.

In some higher accuracy applications, dld 602 and icm_amp 604 are implemented with complicated structures such as multiple stage amplifiers. Even with such structures, the differences between the output voltage potentials of dld 602 and icm_amp 604 can result in the error of the output current of icm_amp 604 not being exactly copied but being copied with the ratio of k (k is usually less than 1) from dld 602 to icm_amp 604. This current difference comes from the difference of the resistance and capacitance load between node A1 and node A2. In other applications with higher accuracy, wherein the dld 602 and the icm_amp 604 need to be implemented with more complicated structure such as multiple stage amplifiers, the voltage differences at the internal nodes between the dld 602 and icm_amp 604 are increased. Thus sharing as much front-end portions as possible is a solution to minimize the voltage differences between the internal nodes of the ald 602 and the icm_amp 604.

Figure 7:
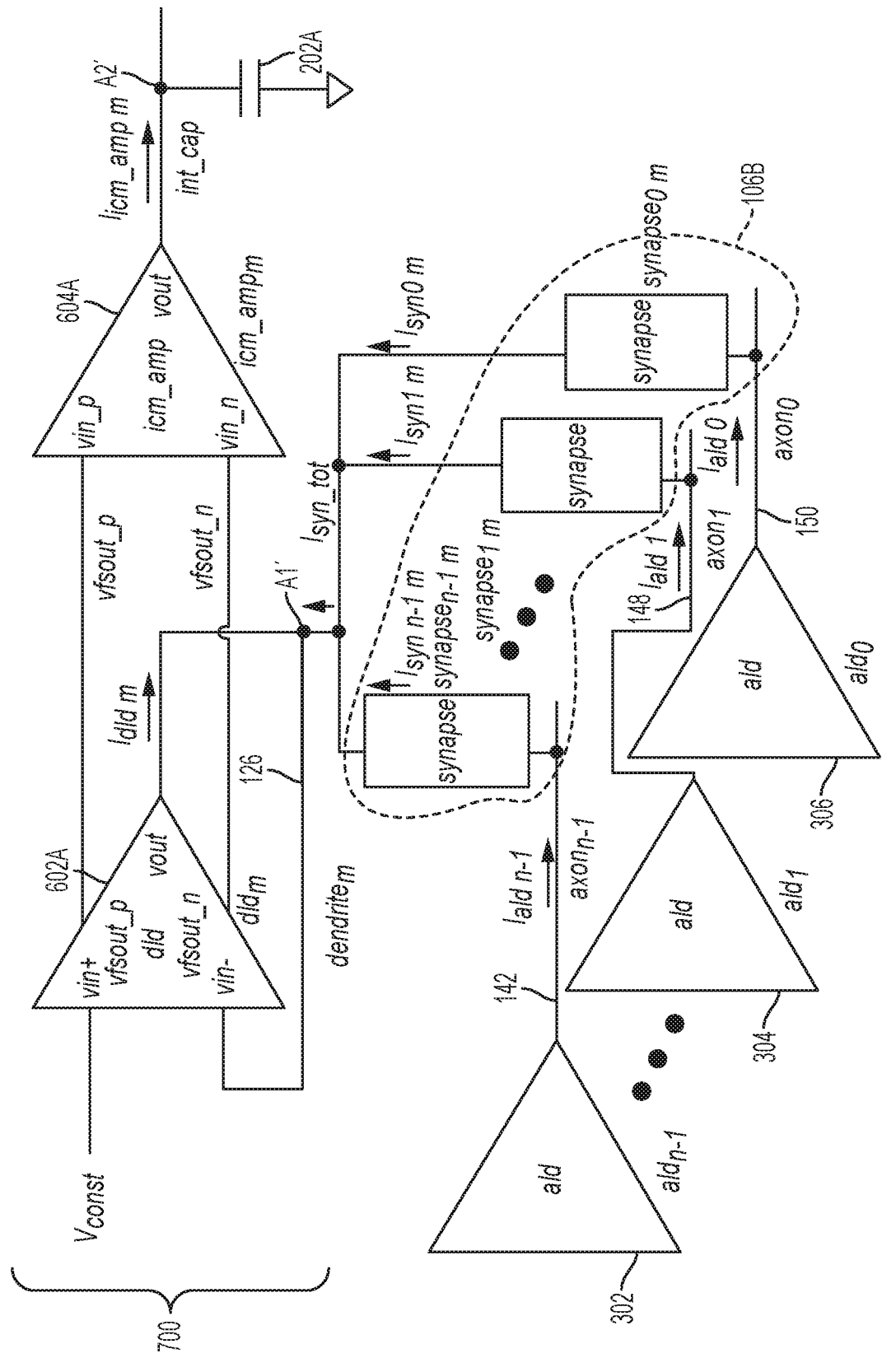
FIG. 7 depicts a simplified block diagram of a current integration and control circuit according to one or more embodiments of the present disclosure.

FIG. 7 depicts another modification of system portion 100B, wherein a current integration with voltage hold circuit 700 according to one or more embodiments is provided. It is noted that, although circuit 700 of the present disclosure is described in connection with system portion 100B shown in FIG. 3, the circuit 700 can also be equally applied to the system portion 100B' shown in FIG. 4. The circuit 700 is similar to the circuit 600 (shown in FIG. 6A). The circuit 700 includes a dendrite line driver (dld) 602A and an integration current mirror amplifier (icm_amp) 604A, configured and arranged as shown. Node A of FIG. 3 is separated into node A1' and node A2' in FIG. 7. In circuit 700, dld 602A is supplied with a constant voltage $V_{const}$ into its vin+ input, and the node A1' is connected to its vin− input and vout output. That is, the dld 602A is connected to work as a voltage follower, wherein its vout level is controlled to be equal to its vin+ level, $V_{const}$. In operation, the same amount of current of the total current from (or to) synapse row 106B is pulled (or pushed) by the dld 602 in order to keep the node A1 to the voltage level $V_{constt}$. Thus the current $I_{dld\_m}$ is the copied current of the one from (or to) synapse row 106B.

However, unlike circuit 600, in circuit 700 the current out of icm_amp 604A is generated by copying only the final (output) stage of dld 602A. The amplifier dld 602A includes a first stage (not shown) and a final stage (not shown), and outputs of the first stage are provided as inputs to the final stage. The final (output) stage of dld 602A includes pMOS-FET (not shown) and nMOSFET (not shown). The signal vfsout_p from the first stage of dld 602A into pMOSFET in the final stage and the signal vfsout_n from the first stage of dld 602A into nMOSFET in the final stage are also provided to vin_p and vin_n of icm_amp 604A, respectively. Thus, the first stage outputs (for final stage inputs) of dld 602A are tapped in order to also be used to control icm_amp 604A. By sharing the first stage of the dld 602A with the final stage of the dld 602A and icm_amp 604A, the output current ($I_{dld\_m}$) of the dld 602A is copied (i.e., mirrored) to the output current ($I_{icm\_amp\_m}$) of icm_amp 604A with a certain ratio of k much more precisely than the circuit 600 in FIG. 6A.

Figure 8:
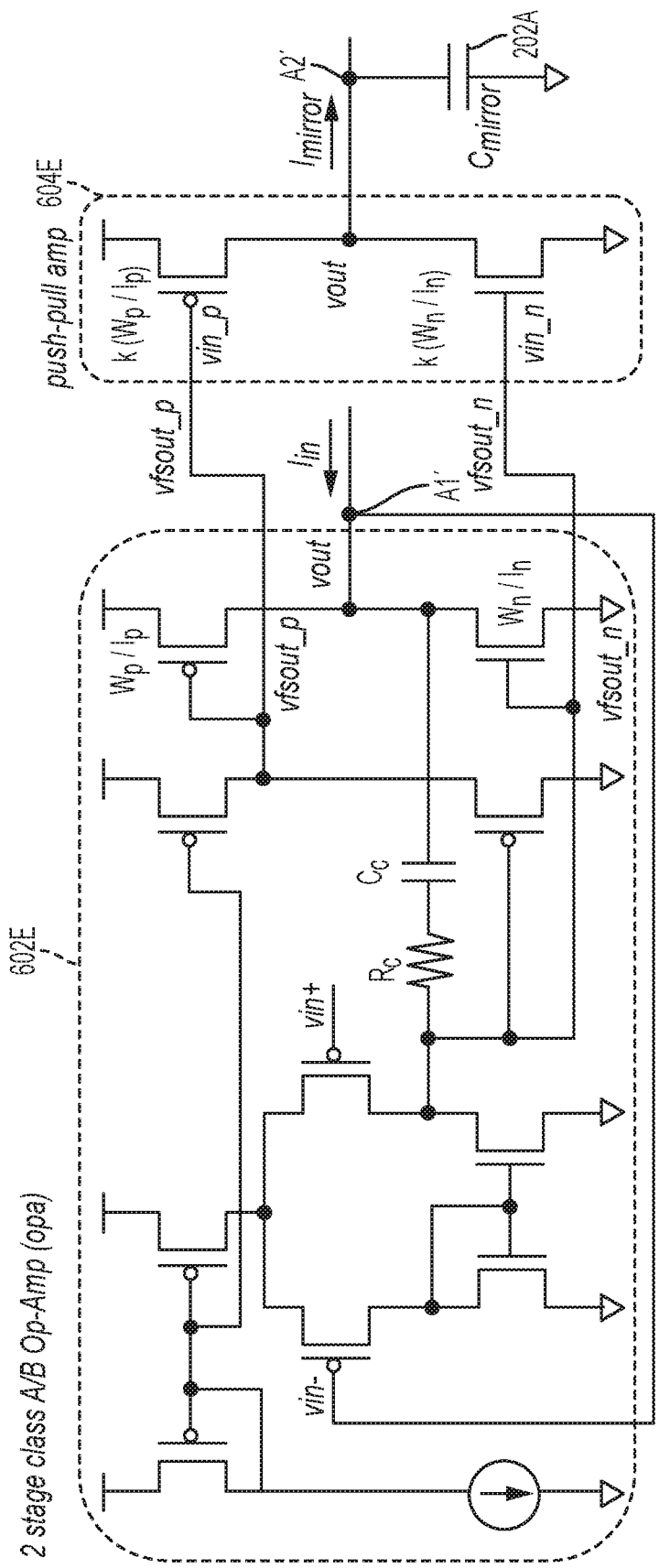
FIG. 8 depicts a detailed circuit implementation of the current integration and control circuits shown in FIG. 6.
Figure 9:
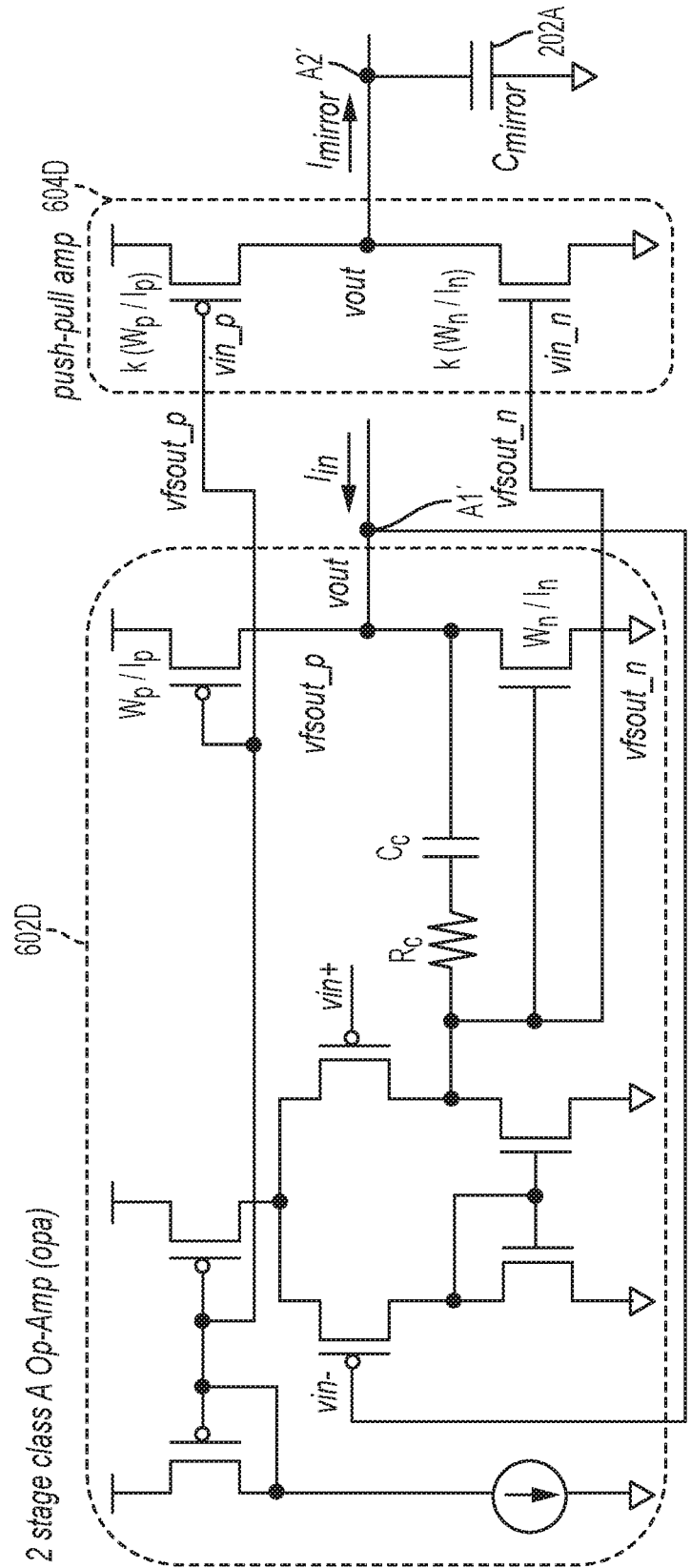
FIG. 9 depicts another detailed circuit implementation of the current integration and control circuits shown in FIG. 6.
Figure 10:
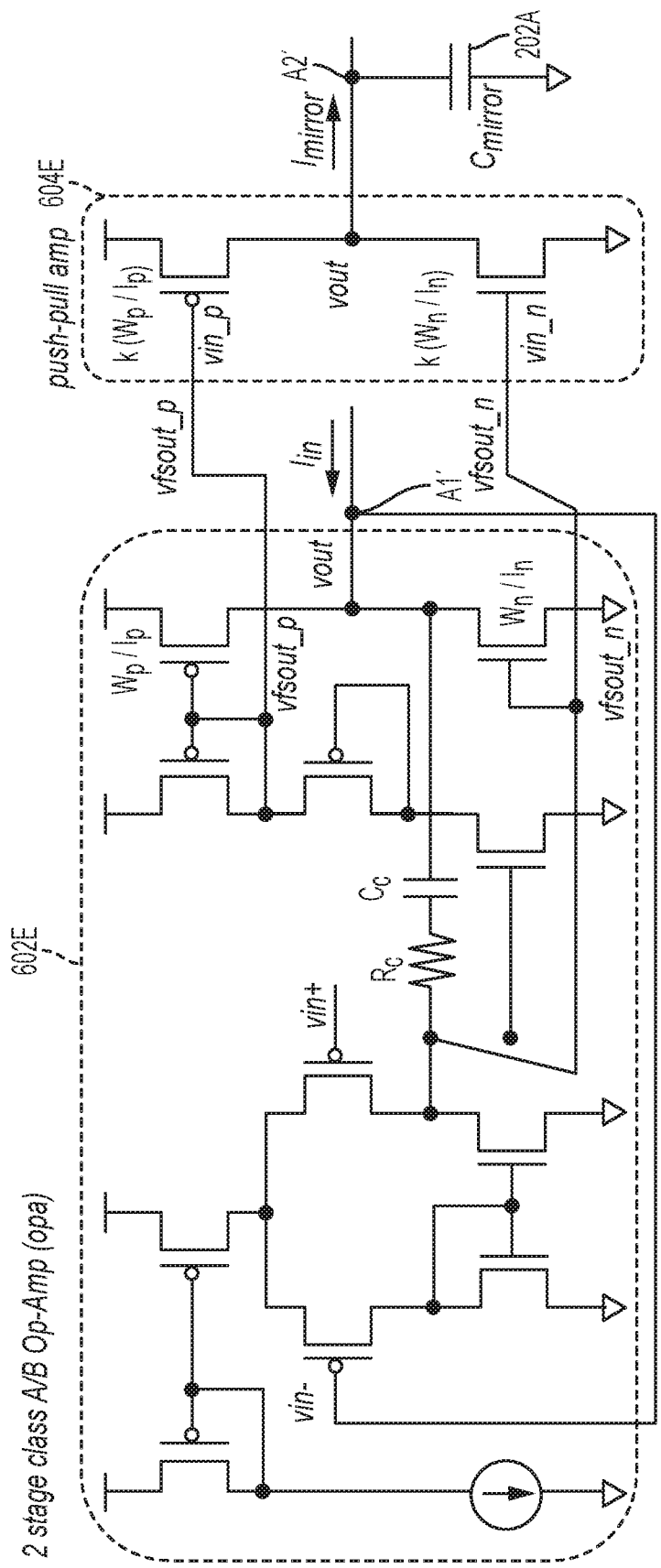
FIG. 10 depicts another detailed circuit implementation of the current integration and control circuits shown in FIG. 6.

FIGS. 8-10 depict examples of internal structures for dld 602A and icm_amp 604A shown in FIG. 7. More specifically, FIG. 8 depicts examples of the internal structures of a dld 602C and an icm_amp 604C as a 2-stage class A/B operational amplifier and a push-pull amplifier, respectively. FIG. 9 depicts examples of the internal structures of a dld 602D and an icm_amp 604D as a 2-stage class A operational amplifier and a class A amplifier, respectively. FIG. 10 depicts additional examples of the internal structures of a dld 602E and an icm_amp 604E as a 2-stage class A/B operational amplifier and a push-pull amplifier, respectively. The operations of circuits 600 and 700 according to the present disclosure can be applied to other types of amplifiers, including single stage amplifiers by using one common input stage with two independent output current mirror stages which are connected in parallel. By scaling up/down or tuning the size ratio k of the final stage, the driver power of dld 602, 602A, 602C, 602D, 602E and icm_amp 604, 604A, 604C, 604D, 604E can be adjusted to the application's requirements such as high-performance operations or low-power operations.

Figure 11:
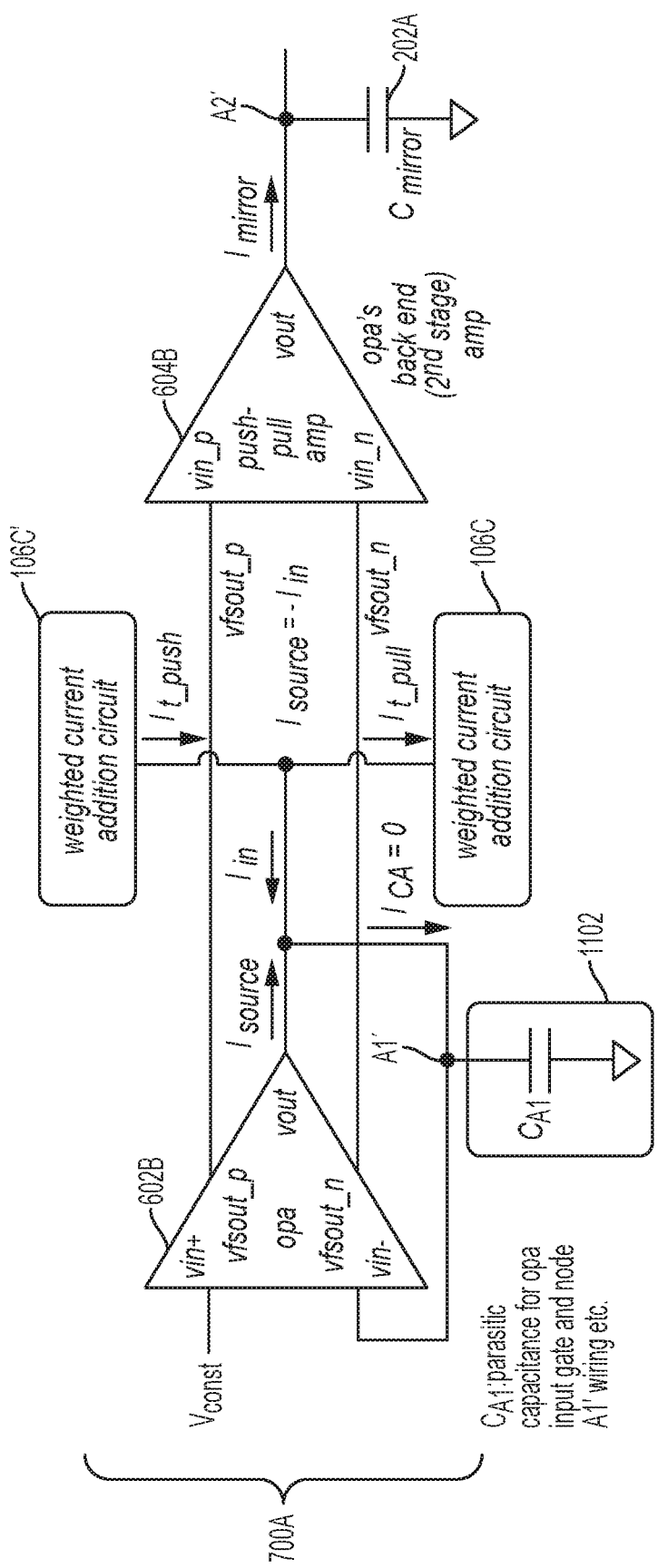
FIG. 11 depicts a simplified block diagram of a current integration circuit with a proposed current mirror scheme according to one or more embodiments.
Figure 12:
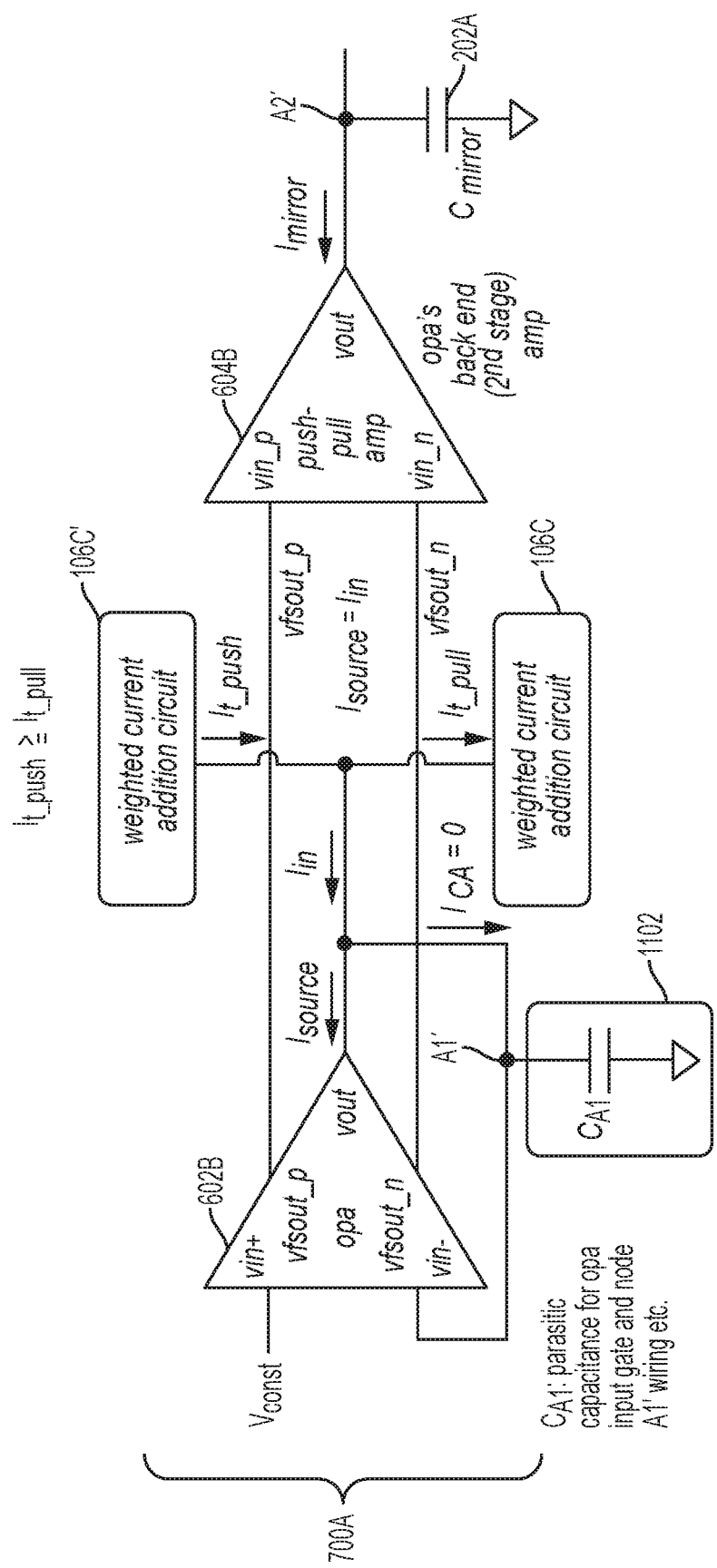
FIG. 12 depicts a simplified block diagram of a current integration circuit with a proposed current mirror scheme according to one or more embodiments.
Figure 13:
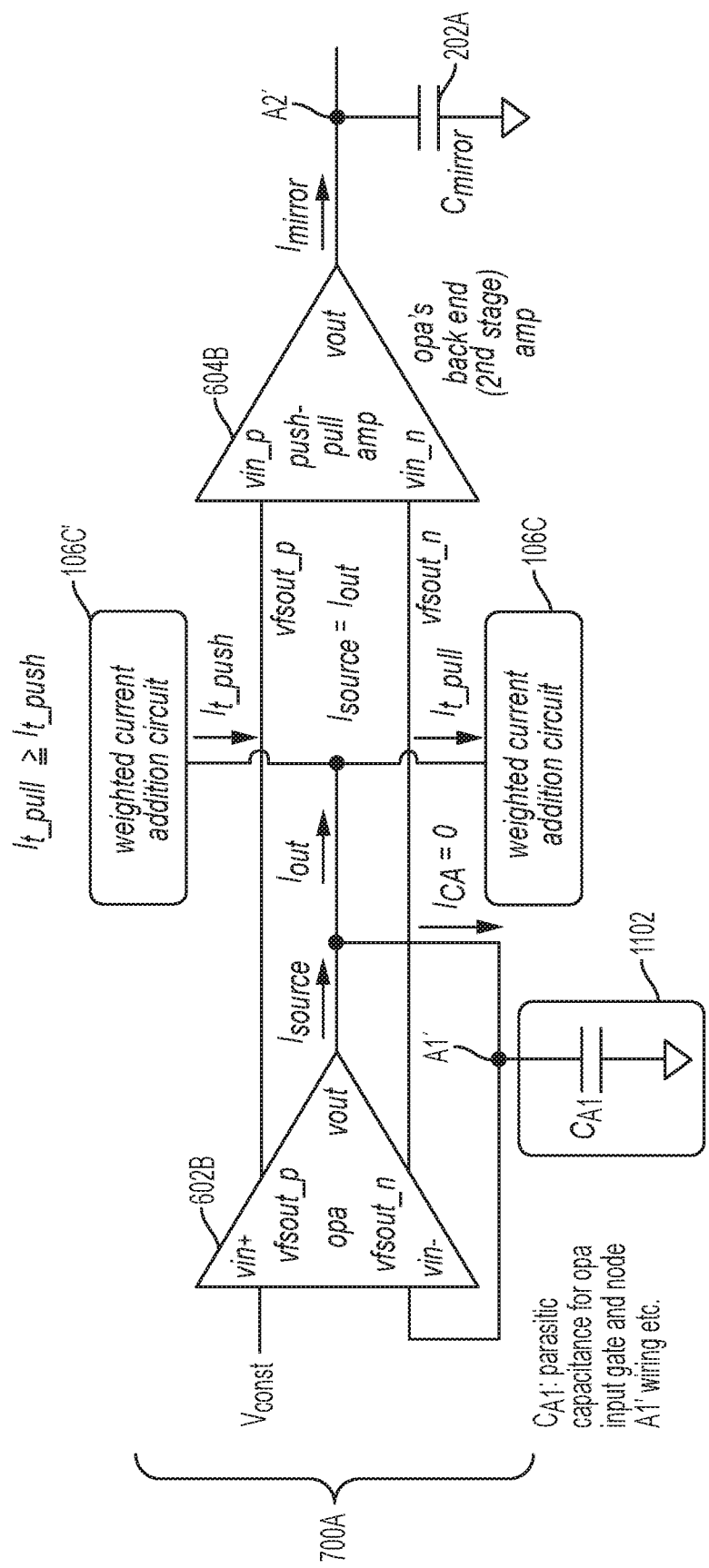
FIG. 13 depicts a simplified block diagram of a current integration circuit with a proposed current mirror scheme according to one or more embodiments.

FIGS. 11-13 depict a circuit 700A, which is an implementation of circuit 700 (shown in FIG. 7), wherein dld 602A is implemented as a 2-stage operational amplifier (opa) 602B, and wherein icm_amp 604A is implemented as a push-pull amplifier (push-pull amp) 604B. The push-pull amp 604B is the same circuit as the final stage of opa 602B with the same or a reduced size. Thus, the front end of opa 602B is commonly used for driving node A1' and node A2'. The circuit 700A depicts the parasitic capacitance ($C_{A1}$) 1102 of opa 602B. The parasitic capacitance 1102 results from the fact that dendrite line 126 (shown in FIG. 1) ranges over a relatively long and wide area due to multiple synapses 104 (shown in FIG. 1) arranged on weighted synapse row 106 (shown in FIG. 1). Because the voltage of parasitic capacitance 1102 is kept constant by opa 602B, if the parasitic capacitance 1102 is too small dendrite$_m$ node A1' will have small voltage fluctuations. On the other hand, if the parasitic capacitance 1102 is too large, the tacking response of dendrite$_m$ node A1' will be slow. Thus, distance and area design parameters of weighted synapse row 106 and resulting parasitic capacitance 1102 should be set to appropriate values for the desired functionality of the disclosed feedback control system. The circuit 700A also illustrates the influence of weighted current addition circuit 106C under different operation conditions. If integrating capacitor 202A is charging, weighted current addition circuit (106C) is operating in a current push-out configuration. If integrating capacitor 202A is discharging, weighted current addition circuit 106C' is in a current pull-in configuration.

As shown in FIG. 11, the voltage potential of node A1' is controlled to equal $V_{const}$, The current $I_{in}$ is equal to $-I_{source}$, and $I_{in}$ is determined by $I_{t\_push}$ minus $I_{t\_pull}$. The current $I_{source}$ is equal to $-I_{in}$, and $I_{source}$ is mirrored to $I_{mirror}$. Thus, the current $I_{mirror}$ at output node A2' is controlled within the minimum undesired current fluctuations.

FIG. 12 depicts circuit 700A under operating conditions in which $I_{t\_push} \geq I_{t\_pull}$. The current $I_{in}$ is determined by $I_{t\_push}$ minus $I_{t\_pull}$. The current $I_{source}$ has to be equal to $I_{in}$, in order to make $I_{CA}$ zero. Otherwise, the voltage of node A1' will not follow $V_{const}$ due to charging or discharging of the parasitic capacitance 1102. Thus, $I_{source}$ (which equals $I_{in}$) is mirrored to $I_{mirror}$, and the current at output node A2' is controlled within the minimum undesired current fluctuations.

FIG. 13 depicts circuit 700A under operating conditions in which $I_{t\_pull} \geq I_{t\_push}$. The current $I_{out}$ is determined by $I_{t\_pull}$ minus $I_{t\_push}$. The current $I_{source}$ has to be equal to $I_{out}$, in order to make $I_{CA}$ zero. Otherwise, the voltage of node A1' will not follow $V_{const}$ due to charging or discharging of the parasitic capacitance 1102. Thus, $I_{source}$ (which equals $I_{out}$) is mirrored to $I_{mirror}$, and the current at output node A2' is controlled within the minimum undesired current fluctuations.

Accordingly, the present disclosure provides a number of technical benefits. The present disclosure provides an ANN having current mirror driver circuitry that suppresses charging current fluctuation at a charging node of an integrating neuron membrane potential circuit, thereby exactly mirroring (or copying) current from upstream weighted synapse circuitry to downstream integrating neuron circuitry. For one or more embodiments, it is noted that the node for synapse current addition is originally same as the neuron membrane potential node for current integration with a capacitor. According to the present disclosure, the neuron membrane potential node for current integration with capacitor is separated from the node for synapse current addition. The node for synapse current addition is driven by a first amplifier having a voltage follower configuration that controls the output voltage of the first amplifier to track a constant voltage which is given to the input of the first amplifier. The neuron membrane potential node for current integration with capacitor is driven by a second amplifier with the same circuit structure as the first amplifier having the same constant voltage input as the first amplifier, and also having a current mirror function of the first amplifier such that the output current of the first amplifier is mirrored to the output current of the second amplifier. In order to provide more precise control, instead of using the second amplifier with the same circuit structure as the first amplifier and with the same constant input voltage as provided to the first amplifier, the second amplifier may have only final output stage and be controlled by a first stage output (i.e., final stage input) of the first amplifier to share the first stage of the first amplifier with first stage amplifier and second stage amplifier. This enables the most precise current mirror control due to minimum circuit difference between the final amplifier and second amplifier.

The flowchart and block diagrams in the Figures illustrate the architecture, functionality, and operation of possible implementations of systems and methods according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method of operating a driver circuit, the method comprising:
   controlling a first node of an artificial neural network (ANN) using a first amplifier comprising a first-stage and a second-stage;
   wherein the first-stage is communicatively coupled to the second-stage in a voltage follower configuration comprising:
      a constant voltage supplied to a first input of the first-stage; and
      a second input of the first-stage and an output of the second-stage communicatively coupled to the first node;
   wherein controlling the first node of the ANN comprises using the voltage follower configuration to control the first node in a manner that maintains a voltage of the first node at a constant value, and further using the voltage follower configuration to control the first node in a manner that maintains an output current of the second-stage into the first node at a value without the effect of a voltage fluctuation; and
   controlling a second node of the ANN using a second amplifier and the second stage of the first amplifier;
   wherein the first-stage is communicatively coupled to the second-stage and the second amplifier such that the second-stage and the second amplifier are in a current mirror configuration comprising:
      a first first-stage output of the first-stage communicatively coupled as inputs to the second-stage and the second amplifier; and
      a second first-stage output of the second-stage communicatively coupled as inputs to the second-stage and the second amplifier;
   wherein the current mirror configuration further comprises the second stage of the first amplifier, acting independently of the first stage of the first amplifier, is-used to amplify and mirror the output of the second stage at an output of the second amplifier;
   wherein controlling the second node of the ANN comprises using the current mirror configuration to mirror the output current of the second-stage at the output of the second amplifier; and
   wherein using the method of operating the driver circuit enables the first node to be separate from and not directly connected to the second node.

2. The method of claim 1, wherein:
   the first node comprises an output of a weighted current addition circuit;
   the weighted current addition circuit pushes current through the first node;
   the weighted current addition circuit pulls current through the first node; and
   the second node comprises an input to an integrating capacitor circuit.

3. The method of claim 1, wherein:
   the first amplifier comprises a first amplifier positive input and a first amplifier negative input;
   the second amplifier comprises a second amplifier positive input and a second amplifier negative input;
   inputs to the first amplifier positive input and the second amplifier positive input are substantially the same; and
   inputs to the first amplifier negative input and the second amplifier negative input are substantially the same.

4. The method of claim 1, wherein:
   the first amplifier comprises first amplifier internal components;
   the second amplifier comprises second amplifier internal components; and
   the second amplifier internal components have substantially the same structure and size as the first amplifier internal components.

5. A method of operating a driver circuit, the method comprising:
   using a first amplifier comprising a voltage follower to control a first node to maintain a voltage of the first node at a constant value;
   wherein the first amplifier comprises a first amplifier first stage and a first amplifier final stage which generates an output current for reference;
   using the first amplifier comprising the voltage follower to further have the first amplifier final stage output current into the first node at a value without effect by a voltage fluctuation;
   wherein the first amplifier final stage output is coupled into the first node; and
   using a second amplifier and the second stage of the first amplifier to control a second node;
   wherein the first amplifier first stage is communicatively coupled to the first amplifier final stage and the second amplifier such that the first amplifier final stage and the second amplifier are in a current mirror configuration comprising:
- a first amplifier first stage output communicatively coupled as inputs to the first amplifier final stage and the second amplifier; and
- a second first amplifier first stage output communicatively coupled as inputs to the first amplifier final stage and the second amplifier;

wherein the current mirror configuration further comprises the second stage of the first amplifier, acting independently of the first stage of the first amplifier, is-used as to amplify and mirror the output of the second stage at an output of the second amplifier;

wherein using the second amplifier to control the second node comprises using the current mirror configuration to mirror the first amplifier final stage output current at the output of the second amplifier; and wherein using the method of operating the driver circuit enables the first node to be separate from and not directly connected to the second node.

6. The method of claim 5, wherein:
the first amplifier first stage comprises a first amplifier first stage positive output and a first amplifier first stage negative output;
the second amplifier comprises a second amplifier positive input and a second amplifier negative input;
the first amplifier first stage positive output is coupled to the first amplifier final stage and the second amplifier positive input; and
the first amplifier first stage negative output is coupled to the first amplifier final stage and the second amplifier negative input.

7. The method of claim 5, wherein:
the first amplifier final stage comprises first amplifier final stage internal components;
the second amplifier comprises second amplifier internal components; and
the second amplifier internal components have substantially the same structure and size as the first amplifier final stage internal components.

8. A driver circuit comprising:
a first amplifier comprising a voltage follower configured to control a first node to maintain a voltage of the first node at a constant value, and to have a first amplifier output current into the first node at value without effect by a voltage fluctuation; and
a second amplifier and the second stage of the first amplifier configured to control a second node;
wherein the first amplifier first stage is communicatively coupled to the first amplifier final stage and the second amplifier such that the first amplifier final stage and the second amplifier are in a current mirror configuration comprising:
- a first amplifier first stage output communicatively coupled as inputs to the first amplifier final stage and the second amplifier; and
- a second first amplifier first stage output communicatively coupled as inputs to the first amplifier final stage and the second amplifier;

wherein the current mirror configuration further comprises the second stage of the first amplifier, acting independently of the first stage of the first amplifier, is-used as to amplify and mirror the output of the second stage at an output of the second amplifier;
wherein the second amplifier configured to control the second node comprises using the current mirror configuration to mirror the first amplifier final stage output current at the output of the second amplifier; and
wherein the driver circuit enables the first node to be separate from and not directly connected to the second node.

9. The circuit of claim 8, wherein the first node comprises an output of a weighted current addition circuit.

10. The circuit of claim 9, wherein the weighted current addition circuit pushes current through the first node.

11. The circuit of claim 9, wherein the weighted current addition circuit pulls current through the first node.

12. The circuit of claim 8, wherein the second node comprises an input to an integrating capacitor circuit.

13. The circuit of claim 8, wherein:
the first amplifier comprises a first amplifier positive input and a first amplifier negative input;
the second amplifier comprises a second amplifier positive input and a second amplifier negative input;
inputs to the first amplifier positive input and the second amplifier positive input are substantially the same; and
inputs to the first amplifier negative input and the second amplifier negative input are substantially the same.

14. The circuit of claim 8, wherein:
the first amplifier comprises first amplifier internal components;
the second amplifier comprises second amplifier internal components; and
the second amplifier internal components have substantially the same structure and size as the first amplifier internal components.

15. A driver circuit comprising:
a first amplifier comprising a first amplifier first stage and a first amplifier final stage which generates an output current as a reference current of a current mirror;
wherein the first amplifier final stage current output node is coupled into a first node;
wherein the first amplifier further comprises a voltage follower configured to control the first node to maintain a voltage of the first node at a constant value, and to have the first amplifier final stage output current into the first node at a value without the effect by a voltage fluctuation; and
a second amplifier and the second stage of the first amplifier configured to control a second node;
wherein the first amplifier first stage is communicatively coupled to the first amplifier final stage and the second amplifier such that the first amplifier final stage and the second amplifier are in a current mirror configuration comprising:
- a first amplifier first stage output communicatively coupled as inputs to the first amplifier final stage and the second amplifier; and
- a second first amplifier first stage output communicatively coupled as inputs to the first amplifier final stage and the second amplifier;

wherein the current mirror configuration further comprises the second stage of the first amplifier, acting independently of the first stage of the first amplifier, is-used to amplify and mirror the output of the second stage at an output of the second amplifier;
wherein the second amplifier configured to control the second node comprises using the current mirror configuration to mirror the first amplifier final stage output current at the output of the second amplifier; and
wherein the driver circuit enables the first node to be separate from and not directly connected to the second node.

16. The circuit of claim 15, wherein the first node comprises an output of a weighted current addition circuit.

17. The circuit of claim 16, wherein the weighted current addition circuit pushes current through the first node.

18. The circuit of claim 16, wherein the weighted current addition circuit pulls current through the first node.

19. The circuit of claim 15, wherein the second node comprises an input to an integrating capacitor circuit.

20. The circuit of claim 15, wherein:
the first amplifier first stage comprises a first amplifier first stage positive output and a first amplifier first stage negative output;
the first amplifier final stage comprises a first amplifier final stage positive input and a first amplifier final stage negative input;
the second amplifier comprises a second amplifier positive input and a second amplifier negative input;
the first amplifier first stage positive output is coupled to the first amplifier final stage positive input and the second amplifier positive input; and
the first amplifier first stage negative output is coupled to the first amplifier final stage negative input and the second amplifier negative input.

21. The circuit of claim 15, wherein:
the first amplifier final stage comprises first amplifier final stage internal components;
the second amplifier comprises second amplifier internal components; and
the first amplifier final stage internal components have substantially the same structure and size as the second amplifier internal components.

22. A driver circuit comprising:
a first amplifier comprising a first amplifier first stage, a first amplifier first stage positive output, a first amplifier first stage negative output, a first amplifier final stage and a first amplifier final stage output current which generates output current as a reference current of a current mirror;
wherein the first amplifier final stage current output node is coupled into a first node;
wherein the first amplifier further comprises a voltage follower configured to control the first node to maintain a voltage of the first node at a constant value, and to have the first amplifier final stage output current into the first node at a value without effect by a voltage fluctuation; and
a second amplifier and the second stage of the first amplifier configured to control a second node;
wherein the second amplifier comprises a second amplifier positive input and a second amplifier negative input;
wherein the first amplifier final stage comprises a first amplifier final stage positive input and a first amplifier final stage negative input;
wherein the first amplifier final stage and the second amplifier are communicatively coupled in a current mirror configuration comprising:
the first amplifier first stage positive output coupled to the first amplifier final stage positive input and the second amplifier positive input; and
the first amplifier first stage negative output coupled to the first amplifier final stage negative input and the second amplifier negative input;
wherein the first amplifier final stage comprises first amplifier final stage internal components;
wherein the second amplifier comprises second amplifier internal components;
wherein the second amplifier final stage internal components have substantially the same structure and size as the first amplifier internal components;
wherein the current mirror configuration further comprises the second stage of the first amplifier, acting independently of the first stage of the first amplifier, is-used to amplify and mirror the output of the second stage at an output of the second amplifier; and
wherein the second amplifier configured to control the second node comprises using the current mirror configuration to mirror the first amplifier final stage output current at the output of the second amplifier; and
wherein the driver circuit enables the first node to be separate from and not directly connected to the second node.

23. The circuit of claim 22, wherein the first node comprises an output of a weighted current addition circuit.

24. The circuit of claim 23, wherein:
the weighted current addition circuit pushes current through the first node; or
the weighted current addition circuit pulls current through the first node.

25. The circuit of claim 22, wherein the second node comprises an input to an integrating capacitor circuit.

* * * * *